LOW EXPANSION MATERIAL

Filed Sept. 11, 1967 2 Sheets-Sheet 1

INVENTORS
KOICHI IKEDA
KATSUJI MINAGAWA
NOBORU YAMAMOTO
BY
Hopgood & Calimafde
ATTORNEYS INVENTORS
KOICHI IKEDA
KATSUJI MINAGAWA
NOBORU YAMAMOTO
BY Hopgood & Calimafde
ATTORNEYS 3,533,965

LOW EXPANSION MATERIAL

Koichi Ikeda, Katsuji Minagawa, and Noboru Yamamoto, Tokyo, Japan, assignors to Nippon Electric Company, Limited, Tokyo, Japan, a Japanese corporation Filed Sept. 11, 1967, Ser. No. 666,704
Claims priority, application Japan, Sept. 13, 1966, 41/60,510
Int. Cl. H01b *1/06*
U.S. Cl. 252—511 7 Claims

ABSTRACT OF THE DISCLOSURE

A low expansion sealing material is provided for hermetically sealing electronic devices comprising a mixture of hardenable synthetic resin which when hardened is capable of maintaining its hardened state below a first temperature and a compound characterized by a crystal transformation at a second temperature below the first temperature, such that the compound in the mixture abruptly contracts when heated to about the second temperature. The hermetically sealed device may comprise a lead conductor and a body portion to which the conductor is coupled, the sealing material being employed at least at the coupled portion.

This invention relates to a sealing material having low expansion properties and, in particular, to a sealing material for use in hermetically sealing electronic circuit components or devices.

DETAILED EXPLANATION OF INVENTION

This invention relates to material of low expansion property, particularly to such a material suited for use in hermetic sealing of electronic circuit components.

Heretofore, electric parts, particularly electronic circuit components such as electron tubes and semiconductor devices having many spots which must be hermetically sealed have been sealed mainly by use of one or more materials selected from glass, ceramics, and metals at elevated temperatures. However, those conventional sealed assemblies are considerably expensive due to the high temperature processing. It was therefore very difficult to reduce the price without lowering the quality of electronic circuit components such as semiconductor devices. Under such a circumstance as the above, the prices of semiconductor device and other electric parts for which high vacuum is not required have been reduced by directly molding elements with a resin. This process has enabled not only the use of material of lower price than that used in the conventional process for metal cap sealing, but also a reduction in price of the product. However, semiconductor devices manufactured by this resin-molding technique were defective in that they deteriorated when subjected to a high temperature and high humidity test. This is considered to be attributable to a wide difference in expansion coefficient between the resin and lead wires molded therein, which causes partial separation of the lead wires from the resin during storage at high temperature with the result that moisture passes to an element through the separated portions and deteriorates the element. It is therefore obvious that the reliability of resin-molded products is inferior to that of the products hermetically sealed by glass, ceramics, metals, and the like. Attempts have been made to lower the expansion coefficient of a resin in order to eliminate above-mentioned defect of the resin, and a resin containing a compound having negative expansion property such as $\beta$-eucriptite having the chemical composition of $Li_2O \cdot Al_2O_3 \cdot 2SiO_2$ has been found to show a considerable small expansion coefficient. Nevertheless, the expansion coefficient of this resin is still larger than that of lead wires whereby the effects of moisture described above have not been eliminated.

The object of this invention is to provide a low expansion material which is inexpensive and yet highly reliable, having an expansion coefficient adjustable to that of metals, ceramics, glass, or the like.

Figure 1:
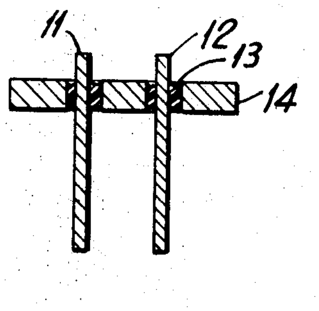
FIG. 1 is a longitudinal cross-sectional view of a hermetic sealing terminal to illustrate the example of this invention.
Figure 3:
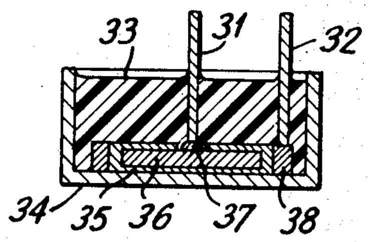
FIG. 3 is a longitudinal cross-sectional view of an example of semiconductor device adopting a hermetic sealing material of this invention.
Figure 2:
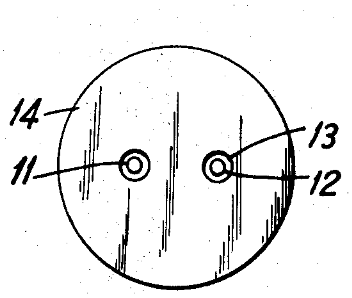
FIG. 2 is a top view showing hermetic sealing terminal of FIG. 1.
Figure 4:
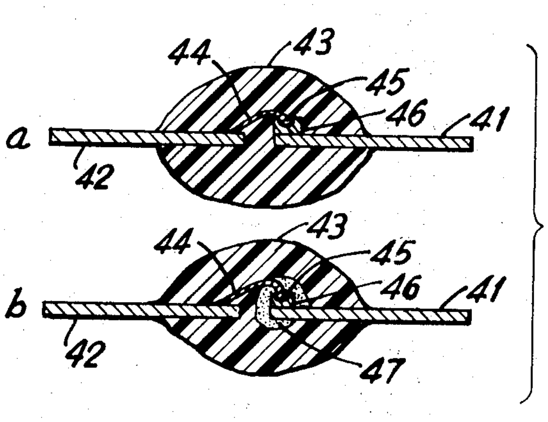
FIGS. 4*a* and 4*b* are longitudinal cross-sectional views of other two examples of semiconductor device adopting a hermetic sealing material of this invention.
Figure 5:
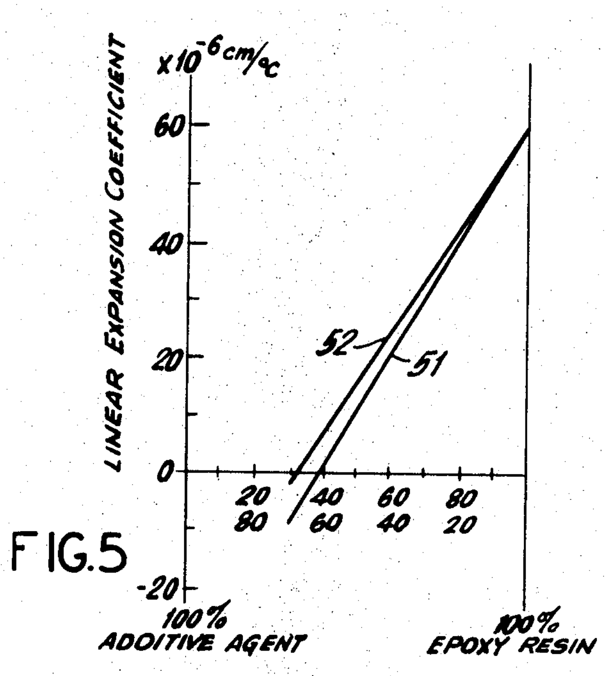
FIG. 5 and FIG. 6 are graphs showing the relationship between composition ratio and expansion coefficient of materials of this invention.
Figure 6:
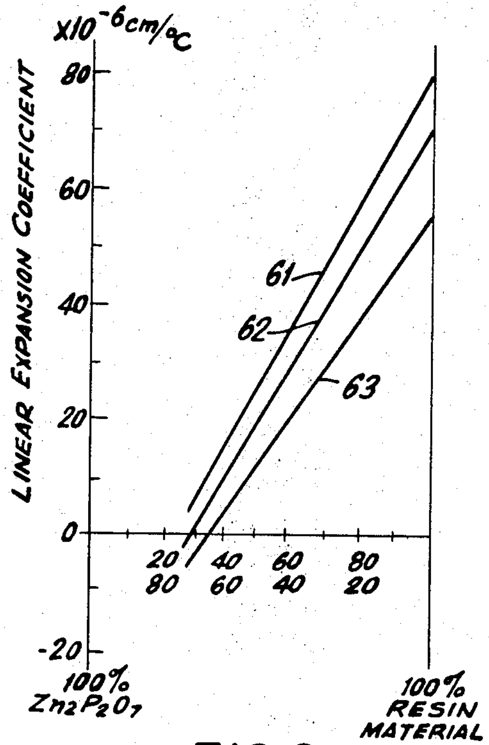
Figure 7:
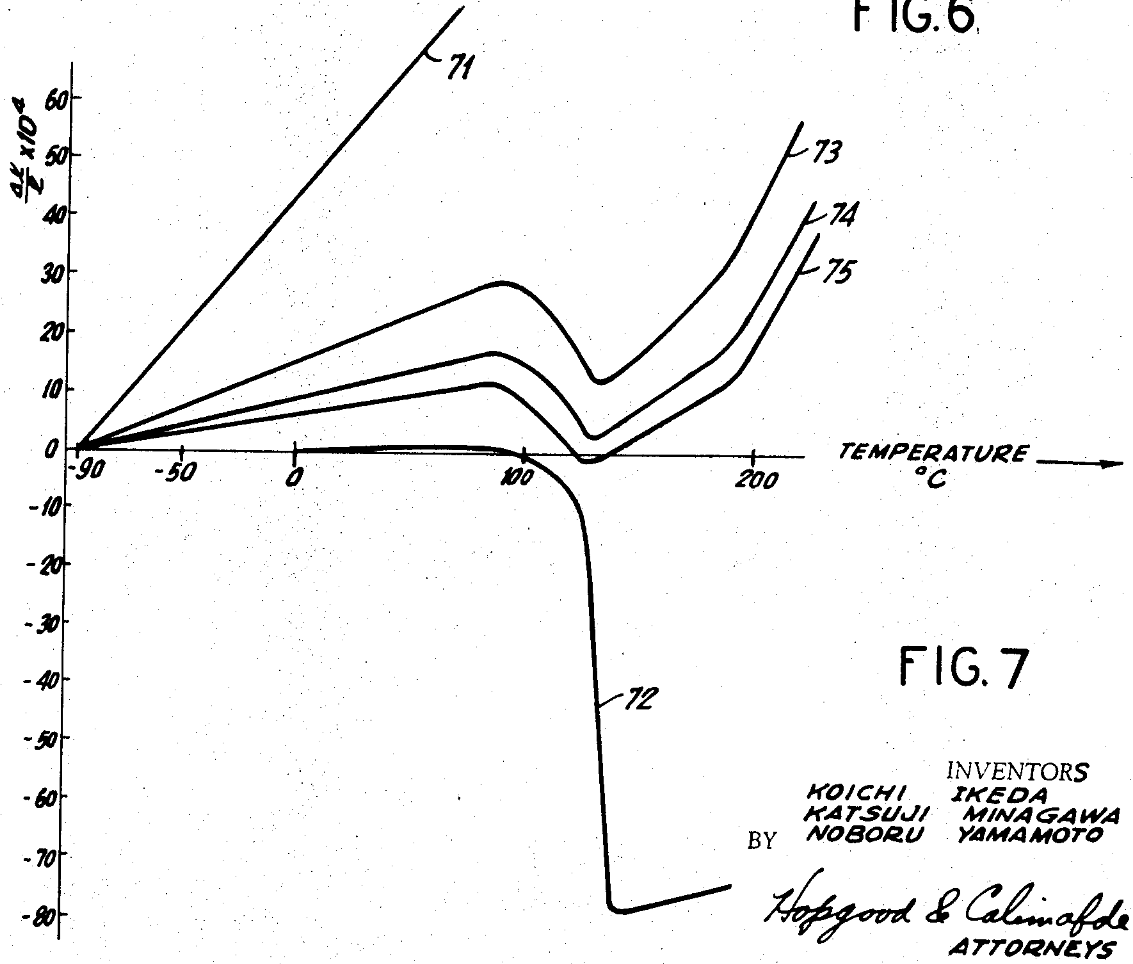
FIG. 7 is a graph of expansion ratio as a function of temperature for epoxy resin, $Zn_2P_2O_7$, and materials of this invention.

Other objects and features of the invention will more clearly appear from the following description and the accompanying drawing, wherein:

FIG. 1 is a longitudinal cross-sectional view of a hermetic sealing terminal provided by the invention;

FIG. 2 depicts a top view of the hermetic sealing terminal of FIG. 1;

FIG. 3 is a longitudinal cross-sectional view of a semiconductor device employing the hermetic sealing material of the invention;

FIGS. 4*a* and 4*b* are longitudinal cross-sectional views of additional embodiments of a semiconductor device using the hermetic sealing material provided by the invention;

FIGS. 5 and 6 are graphs showing the relationship between composition ratio and expansion coefficient of the hermetic material of the invention; and FIG. 7 depicts curves showing change of expansion with temperature for the epoxy resin, $Zn_2P_2O_7$, and materials of the invention.

The characteristics of this invention reside in mixing with an organic material a compound which is contracted in volume by the induced crystal transformation when heated, such as a compound having the chemical composition of $Zn_2P_2O_7$ or $Zn_2P_2O_7$ containing MgO, thereby providing a low expansion material having an expansion coefficient corresponding to that of a metal such as copper, aluminum, iron, nickel, or the like, or alloy of such metal, glass, or ceramic as well as the inexpensive and yet highly reliable hermetically sealed assembly using this material.

According to this invention, it is possible to obtain a resin whose expansion coefficient does not differ from that of lead wires. This makes it possible to obtain a resin-molded type semiconductor device which is not affected by the air since the hermetic sealing previously deemed as impossible has been made possible. More detailed features of this invention are as follows: in the conventional process for lowering expansion coefficient of a resin material, a material having smaller expansion coefficient than the resin irrespective of positive or negative expansion coefficient is mixed with the resin; whereas, this invention resides in the utilization of phase transition of crystals of the material mixed, the expansion coefficient of the material mixed in the resin being smaller than that of the resin. In detail, transition of $Zn_2P_2O_7$ crystal or $An_2P_2O_7$ crystal containing MgO from $\alpha$ type to $\beta$ type crystal takes place rapidly at 130–150° C., and the volume decreases rapidly by about 1.7%–2.7% by the transition from α type to β type. If $Zn_2P_2O_7$ is mixed with the resin, it is thus possible to obtain a very small average expansion coefficient for the range of temperature between 0° C. and 150° C. However, it has been considered that the expansion property may not be uniformly small as a result of the rapid shrinkage of $Zn_2P_2O_7$ at 130° C.–150° C. and that the use of such mixed materials in hermetic sealing is impossible. However, this problem can be solved by hardening the resin to the extent that the final product does not soften at temperature near that of phase transition of $Zn_2P_2O_7$. Namely, where the resin containing $Zn_2P_2O_7$ does not soften i.e. is in a completely hardened condition in the neighborhood of 150° C., the gradual transistion of $Zn_2P_2O_7$ from α type crystal to β type crystal or vice versa is discovered to be possible. This phenomenon is considered as follows: where the final product does not soften at 150° C., $Zn_2P_2O_7$ being contained in the final product tends to transform from α type to β type when the final product is heated from room temperature up to above 150° C. At that time, volume contraction of $Zn_2P_2O_7$ is interfered by the hardened resin, and the transition takes place not completely but gradually, so that the average expansion property becomes small. Therefore, by changing the mixing ratio of $Zn_2P_2O_7$ and the resin, it is possible to obtain a mixed material having an expansion coefficient corresponding to that of various materials.

The above-mentioned features and object of this invention will be more clearly understood by the following description of some embodiments of this invention, taken in conjunction with the accompanying drawings.

Referring to the first embodiment of this invention, the hermetically sealed terminal comprising copper and a low expansion mixed material, is explained with reference to FIG. 1 and FIG. 2. Copper lead wires 11 and 12 of 1 mm. in diameter were inserted into two holes of 3 mm. in diameter of a copper base plate 14, respectively, and then the spacings between the base plate 14 and the lead wires 11 and 12 were filled with a low expansion mixed material 13 consisting of 50 volume percent of $Zn_2P_2O_7$ powder and 50 volume percent of epoxy resin (Epicoat 828 manufactured by Shell Oil Co. of U.S.A.). The assembly was heated for 1 hour at 100° C. and again for 1 hour at 200° C. to harden the mixed material 13. As a hardening agent of epoxy resin, diaminodiphenylmethane was used. The average linear expansion coefficient of the mixed material used herein was $165\times10^{-7}$ cm./° C. for the range of from −60° C. to 70° C., while the linear expansion coefficient of copper was approximately $170\times10^{-7}$ cm./° C. Accordingly, the completely hermetic terminal was obtained. The hermetically sealed terminal was then subjected to an air-tight test by using Japan Red Check, a permeation defect detector made by Kabushiki Kaisha Kensa Gijitsu Kenkyujo resident in Tokyo and by heating up to about 100° C., and was confirmed to be completely air-tight.

Referring similarly to FIG. 1 and FIG. 2, a second embodiment of this invention, the air-tight terminal of the same shape as the first embodiment, comprising soda glass, 52% nickel-iron alloy, and a low expansion mixed material, is explained. Wires of 52% nickel-iron alloy 11 and 12 were inserted into two holes of a glass base plate 14, and then the spacing between the base plate and the alloy wires were filled with a low expansion mixed material 13 consisting of 58 volume percent of $Zn_2P_2O_7$ powder and 42 volume percent of epoxy resin (Epicoat 828 of Shell Oil Co. of U.S.A.). The mixed material was hardened under the same conditions as in the first embodiment. As a hardening agent of resin, diamino-diphenylmethane was used, similarly to the first embodiment. Average linear expansion coefficient of the mixed material used herein was $98\times10^{-7}$ cm./° C. for the range from −60° C. to 70° C., and linear expansion coefficients of glass and 52% nickel-iron alloy were $95\times10^{-7}$ cm./° C. and $98\times10^{-7}$ cm./° C., respectively. The terminal thus obtained was subjected to an air-tight test same as in the first embodiment, and found the same favorable results as the first embodiment.

Referring also to FIG. 1 and FIG. 2, a third embodiment of this invention is explained, concerning the air-tight terminal of the same shape as the first embodiment and comprising steatite porcelain, 52% nickel-iron alloy, and a low expansion mixed material. An air-tight terminal was manufactured by combining a steatite porcelain base plate 14, the low expansion mixed material 13 used in the second embodiment, and 52% nickel-iron alloy wires 11 and 12 and by hardening the resin under the same conditions as in the second embodiment. The linear expansion coefficient of steatite porcelain was $101\times10^{-7}$ cm./° C. for temperature range between 0° C. and 200° C. The terminal thus obtained was also confirmed to be completely air-tight, similarly to the first and second embodiments. The above-explained air-tight terminal obtained through air-tight sealing process shown in FIG. 1 and FIG. 2 is applicable to lead outlets of semiconductor devices, sealing terminals of refrigeration compressors and various measuring instruments, and terminal outlets of mercury contact-point relay and lead relay.

Next, with reference to FIG. 3, a fourth embodiment of this invention wherein air-tight sealant was applied to a semiconductor device is explained. A semiconductive element such as a solar battery or a diode having two regions 35, 36 of mutually different conductivity types to which regions lead wires of 52% nickel-iron alloy 31 and 32 are attached with the aid of conductive materials 37 and 38 was installed in a soda glass container 34. Then the mixed epoxy resin 33 used in the second embodiment was filled in the container and was hardened under the same conditions as in the first, second or third embodiment. The semiconductor device thus obtained was subjected to a high temperature, high humidity test at 65° C. and 95% relative humidity, but indicated no sign of deterioration even after the elapse of 1,000 hours.

Further, with reference to FIG. 4*a*, a fifth embodiment wherein this invention was applied to the semiconductor device is explained. After a copper wire 41 was soldered at its one end to one region 46 of semiconductor element and another region 45 of the semiconductor element and one end of another copper wire 42 was connected by means of fine gold wire 44, the assembly was molded in the mixed epoxy resin 43 used in the first embodiment. The resin was then hardened under the same conditions as in the first embodiment. The semiconductor device thus obtained was subjected to a high temperature, high humidity at 65° C. and 95% relative humidity, but indicated no sign of deterioration even after the elapse of 1,000 hours. Also, as shown in FIG. 4*b*, a favorable result was obtained when silicon varnish 47 was coated over the surface of semiconductor element and the end portion of copper wire 41.

The composition and mixing ratio of the low expansion mixed material of this invention are not to be limited to those used in the above embodiments. Referring to FIG. 5 in which the abscissa indicates a mixing ratio of epoxy resin and an additive agent by volume percent and the ordinate indicates average linear expansion coefficient at the temperature range between 0° C. and 200° C. by $10^{-6}$ cm./° C., it is possible to select the linear expansion coefficient of the mixed material at an optional value within the range of approximately $100\times10^{-7}$ cm./° C. to to $600\times10^{-7}$ cm./° C. by changing the mixting ratio of $Zn_2P_2O_7$ to be added between 70 volume percent and 0% as shown in the line 51 in case where $Zn_2P_2O_7$ is used as an additive agent. In case of the line 52 where $Zn_2P_2O_7$ containing 10 volume percent of MgO is used as an additive agent, the linear expansion coefficient of the mixed material can be set at an optional value within the range of $-20\times10^{-7}$ to $600\times10^{-7}$ cm./° C. by selecting the mixing ratio of the additive agent between about 70 volume percent and 0%. As described above, the reason why the expansion coefficient decreases linearly as the quantity of $Zn_2P_2O_7$ to be added to epoxy resin increases is that $Zn_2P_2O_7$ has the nature of inducing the crystal transformation and the rapid decrease in volume by heat. Therefore, those other substances may be used as an additive agent which induce the crystal transformation and the rapid shrinkage in volume by heat. For instance, as is clearly seen from the line 52 in FIG. 5, $Zn_2P_2O_7$ containing MgO when added as an additive agent to resin can effectively lower the expansion coefficient, as $Zn_2P_2O_7$ can. Similar effects can be expected from $Zn_2P_2O_7$ containing metal oxides other than MgO, or from other substances. Also, other substances may be added together with, or prior to, the addition of $Zn_2P_2O_7$, as the case may be.

Next, with reference to FIG. 6 in which the abscissa indicates the mixing ratio of resin material and $Zn_2P_2O_7$ by volume percent and the ordinate indicates an average linear expansion coefficient at temperature range between 0° C. and 200° C. by $10^{-6}$ cm./° C., it is seen that the expansion coefficient of the mixed material decreases linearly with the increase of $Zn_2P_2O_7$ quantity added in either case of the line 61 where polyester resin is used as a resin material, of the line 62 where silicone resin is used, or of the line 63 where polystyrene resin is used. As can be clearly seen from the line 61, 62, and 63 of FIG. 6, the linear expansion coefficient of the mixed material can be set at an optional value within the ranges of about $60\times10^{-7}$ to $800\times10^{-7}$ cm./° C., 0 to $700\times10^{-7}$ cm./° C., and $-50\times10^{-7}$ to $600\times10^{-7}$ cm./° C. by selecting the content of respective resin materials to about 30 to 100 volume percent respectively. As a resin material, synthetic resins other than the above such as acryl resin and polyethylene resin can be used.

According to this invention, it is thus possible to obtain an air-tight sealant for plural members consisting of at least one kind of glass, ceramics, synthetic resin and metal, by filling the spacings existing between said plural members with a mixed material in which at least the substance such as $Zn_2P_2O_7$ that induces the crystal transformation and the rapid shrinkage in volume by heat is mixed with a synthetic resin in such a ratio as will have an approximately equal expansion coefficient to that of the said member. Incidentally, it has been confirmed that the content of the synthetic resin in the mixed material is favorable to be within the range from 30 to 70 percent in volume.

Refrering to FIG. 7, wherein the abscissa indicates the temperature and the ordinate indicates the ratio of the increments in length of a material caused by the increase in temperature to the initial length at −90° C., the curve 71 is the expansion property of Epicoat 828 epoxy resin made by the Shell Oil Co. of U.S.A. Curve 72 is the expansion property of $Zn_2P_2O_7$ and clearly shows that $Zn_2P_2O_7$ shrinks abruptly at temperatures of 130 to 150° C. The curves 73, 74 and 75 are the expansion properties of the mixed materials made by mixing 45%, 55% and 60% in volume of $Zn_2P_2O_7$ with the said epoxy resin, adding a hardening agent for resin such as diamino-diphenylmethane to the mixture, and hardening the mixture to the extent that the final product may not soften at or below 150° C. It will be easily seen from the curve 73, 74 or 75 that the mixed material of this invention has not only a low value of the average expansion coefficient for the temperature range from 0° C. to 150° C. but also a low expansion property. The reason has been already explained in the description.

Where diamino-diphenylmethane is added as a hardening agent to said Epicoat 828 epoxy resin, 27 g. thereof should be used with respect to 100 g. of the epoxy resin. As a hardening agent for any epoxy resin, diethylamine-propylamine, diethylene-triamine, triethylene-tetramine, tetraethylene - pentamine, methylnadicanhydride, or many other substances well known in the art can be used in the known proportion. The hardening process of the resin in the mixed materials is not limited to that described in the first embodiment but may be the same as any conventional hardening process of a resin to be used in the mixed materials. The sole requirement for the hardening of the resin is that the final product should maintain the hardened state, i.e. should not soften, at temperature near or below the temperature of the crystal transformation of the additive agent such as $Zn_2P_2O_7$. In order to meet this requirement, the resin may be hardened in general by leaving it at a room temperature for a very long time or by heating it at high temperature for a relatively short time. The critical values of temperature and time vary with the type of the resin and with the mutual relation between temperature and time.

This invention is applicable to an electrically conductive adhesive material of low expansion character. For example, the conductive adhesive materials were manufactured by mixing an epoxy resin (Epicoat 898), a powder of silver and a powder of $Zn_2P_2O_7$ in the proportions shown in the following table and by adding diethylamine-propylamine (hardening agent for an epoxy resin) to the mixture by the amount of 8 parts for 100 parts of the epoxy resin. The pot life of these adhesive materials was 2 hours. Immediately after mixed, the materials were heated for 4 hours at 65° C. and subsequently for 70 minutes at 115° C. to harden the contained epoxy resin to such an extent that the hardened materials may not soften at temperature near 150° C. The conductive materials thus hardened had the characteristics shown in the table.

| No. | Composition of the mixture, vol. percent: Epoxy resin | Silver | $Zn_2P_2O_7$ | Volume resistivity, ohm-cm. | Adhesion strength, kg./cm.$^2$ | Average expansion coefficient for temperature range of 0 to 200° C. |
|---|---|---|---|---|---|---|
| 1 | 28 | 34 | 38 | 0.001 | 38 | $75\times10^{-7}$ cm. |
| 2 | 30 | 38 | 32 | 0.002 | 35 | $100\times10^{-7}$ cm. |
| 3 | 33 | 36 | 31 | 0.001 | 38 | $170\times10^{-7}$ cm. |

Thus, by changing the content of $Zn_2P_2O_7$, it becomes possible to optionally change the expansion coefficient of the conductive adhesive material without deteriorating its adhesion strength, electrical conductivity and workability and to obtain a conductive adhesive material having a similar expansion coefficient to those of various materials to which the adhesive material is to be applied. Incidentally, a powder of copper, aluminum, carbon, or the like can be used instead of a silver powder, although the silver powder is most preferable.

The above embodiments and examples of this invention shall not restrict the technical scope of this invention, and the patent right of a patent for this invention shall cover all the low expansion materials mentioned in the claims.

What is claimed is:

1. A low expansion material comprising a mixture of a hardenable synthetic resin selected from the group consisting of epoxy resin, polyester resin, silicone resin, and polystyrene resin, which when hardened is capable of maintaining its hardened state below a first temperature and a compound of $Zn_2P_2O_7$ characterized by a crystal transformation at a second temperature below said first temperature, such that said compound in the mixture abruptly contracts when heated to about said second temperature.

2. The low expansion resin of claim 1, wherein the resin is epoxy resin, and wherein the amount in the mixture constitutes at least about 30% by volume of the mixture.

3. The low expansion resin of claim 2, wherein the amount of epoxy resin ranges from about 30% to 70% by volume.

4. A low expansion electrically conductive adhesive material comprising a mixture of a hardenable synthetic resin selected from the group consisting of epoxy resin, polyester resin, silicone resin and polystyrene resin having an adhesive property and which when hardened is capable of maintaining its hardness below a first temperature, a compound of $Zn_2P_2O_7$ characterized by a crystal transformation at a second temperature below said first temperature, such that said compound in the mixture abruptly contracts when heated to about said second temperature, and an amount of a material of good electrical conductivity selected from the group consisting of silver, copper, aluminum and carbon sufficient to render said low expansion material electrically conductive.

5. The low expansion material of claim 4 wherein the synthetic resin is epoxy resin, the compound is $Zn_2P_2O_7$ and the electrically conductive material is silver.

6. A hermetically sealed electronic device comprising at least one lead conductor and a body portion to which said lead conductor is coupled, said lead conductor being hermetically sealed at at least its coupled portion by a low expansion sealing material comprising a mixture of a hardened synthetic resin selected from the group consisting of epoxy resin, polyester resin, silicone resin and polystyrene resin capable of maintaining its hardened state below a first temperature and a compound of $Zn_2P_2O_7$ characterized by a crystal transformation at a second temperature below said first temperature, such that the compound in the mixture abruptly contracts when the device is heated to about said second temperature.

7. The device of claim 6, wherein the synthetic resin is epoxy resin in an amount at least 30% by volume of the mixture.

References Cited

UNITED STATES PATENTS

| | | | |
|---|---|---|---|
| 3,202,947 | 8/1965 | Budovec. | |
| 3,332,867 | 7/1967 | Miller et al. | 252—512 |
| 3,433,893 | 3/1969 | Hofmann et al. | |
| 3,442,849 | 5/1969 | Tashlick et al. | |

OTHER REFERENCES

Chemical Abstracts, vol. 64.

DOUGLAS J. DRUMMOND, Primary Examiner

U.S. Cl. X.R.

252—514, 521; 260—37